(12) United States Patent
Besling et al.

(10) Patent No.: US 8,833,171 B2
(45) Date of Patent: Sep. 16, 2014

(54) PRESSURE SENSOR

(75) Inventors: Willem Frederik Adrianus Besling, Eindhoven (NL); Peter Gerard Steeneken, Valkenswaard (NL); Olaf Wunnicke, Eindhoven (NL)

(73) Assignee: NXP, B.V., Eindhoven (NL)

( * ) Notice: Subject to any disclaimer, the term of this patent is extended or adjusted under 35 U.S.C. 154(b) by 266 days.

(21) Appl. No.: 13/592,570

(22) Filed: Aug. 23, 2012

(65) Prior Publication Data

US 2014/0053651 A1 Feb. 27, 2014

(51) Int. Cl.
*G01L 11/00* (2006.01)
*G01L 9/12* (2006.01)
*G01L 9/00* (2006.01)

(52) U.S. Cl.
USPC .............. 73/702; 73/754; 73/718; 73/724

(58) Field of Classification Search
USPC .................................. 73/700–756
See application file for complete search history.

(56) References Cited

U.S. PATENT DOCUMENTS

| | | | |
|---|---|---|---|
| 5,142,912 A | 9/1992 | Frische | |
| 6,732,589 B2 * | 5/2004 | Eickhoff et al. | 73/715 |
| 7,176,048 B1 | 2/2007 | Burns | |
| 7,763,487 B2 * | 7/2010 | Villa et al. | 438/50 |
| 2002/0100330 A1 * | 8/2002 | Eickhoff et al. | 73/715 |
| 2006/0147325 A1 * | 7/2006 | Vogeley | 417/413.2 |
| 2006/0260408 A1 * | 11/2006 | Villa et al. | 73/715 |
| 2010/0269595 A1 * | 10/2010 | Villa et al. | 73/718 |
| 2011/0051312 A1 | 3/2011 | Steeneken et al. | |
| 2011/0147861 A1 | 6/2011 | Steeneken et al. | |
| 2012/0048709 A1 | 3/2012 | Steeneken et al. | |
| 2012/0167659 A1 | 7/2012 | Besling et al. | |

FOREIGN PATENT DOCUMENTS

| | | |
|---|---|---|
| EP | 2402284 A1 | 1/2012 |
| WO | 2008149298 A1 | 12/2008 |

OTHER PUBLICATIONS

T. Nakamoto and T. Kobayashi, "Development of Circuit for Measuring both Q-variation and resonant frequency shift of quartz crystal Microbalance," IEEE Trans. Ultrasonics, Ferroelectrics and Frequency control, vol. 41, Nov. 1994. p. 806.

Welham et al., "A laterally driven micromachined resonant pressure sensor," Sensors and Actuators, A 52, 1996, pp. 86-91.

Kapels et al., "Cavity Pressure Determination and Leakage Testing for Sealed-Surface Micromachined Membranes: A Novel On-Wafer Test Method," Micro Electro Mechanical Systems, 1998, pp. 550-555.

Harada et al: "Various applications of resonant pressure sensor chip based on 3-D micromachining" Sensors and Actuators A: Physical, vol. 73, Issue 3, Mar. 30, 1999, pp. 261-266 1999.

(Continued)

*Primary Examiner* — Andre Allen

(57) ABSTRACT

As may be consistent with one or more embodiments discussed herein, an integrated circuit apparatus includes a membrane suspended over a cavity, with the membrane and cavity defining a chamber. The membrane has a plurality of openings therein that pass gas into and out of the chamber. As the membrane is actuated, the volume of the chamber changes to generate a gas pressure inside the chamber that is different than a pressure outside the chamber. A sensor detects a frequency-based characteristic of the membrane responsive to the change in volume, and therein provides an indication of the gas pressure outside the chamber.

25 Claims, 13 Drawing Sheets

(56) References Cited

OTHER PUBLICATIONS

Harris et al., "Ultrasonic transmission and Reception from Bulk-Micromachined Transducers," IEEE Transactions on Ultrasonics, Ferroelectrics and Frequency Control, vol. 48, No. 1, Jan. 2001, pp. 224-231.

Melvas et al., "A Surface Micromachined Resonant Beam Pressure Sensor", Micro Electro Mechanical Systems, IEEE, 2001, pp. 38-41.

Suijlen et al., "Squeeze film damping in the free molecular flow regime with full thermal accommodation," Sens. Actuators A: Phys. (2009).

* cited by examiner

PRESSURE SENSOR

A variety of apparatuses and systems in smart buildings for, e.g., climate control, in aviation for altitude measurements, in white good applications for level sensing, alternative energy, nuclear plants, automotive applications (such as tire pressure monitoring, engine controls, and braking systems), and medical applications (such as intra-ocular pressure and blood pressure sensors, and need pressure sensors that go beyond mere on/off control). Such systems often employ sensors with accurate and linear output to track changes in operation before those changes become critical. The single on/off condition of switch status means it cannot be used in closed-loop systems for trend monitoring. Additional demand for electronic pressure sensors over pressure switches is fueled by the rapid development of microprocessor and microcontroller-based systems.

The emergence of silicon as a sensing material has influenced pressure measurement in industrial and commercial applications. Silicon-based sensors used a technology that has since become known as MEMS, or micro electro mechanical systems. MEMS sensors have been employed in automotive and medical applications within benign environments. Compact in size, they can be relatively inexpensive in high-production volumes. Most MEMS pressure sensors have a piezo resistive or a capacitive read-out.

Many micromachined pressure sensors use a hermetically sealed membrane that seals a reference cavity which is at a certain gauge pressure (in some cases the gauge pressure is vacuum). External pressure is measured via deflection of the membrane due to a pressure difference between the external pressure and the gauge pressure. This deflection can be measured by piezoresistive, capacitive or optical sensors. However, such approaches can be challenging to implement for a variety of reasons. For instance, signal drift may occur if gas pressure in the reference cavity is not stable, which can in turn require a high level of hermiticity of the membrane. In addition, while thin or large-area membranes are desirable for deflection and sensitivity, it is difficult to make thin membranes hermetic. Out-gassing of layers in the reference cavity can require recalibration, and the temperature dependency of cavity pressure (i.e., according to Boyle's law ($P*V=n*R*T$)) can cause issues. Further, if the pressure in the cavity is near vacuum, the external pressure can significantly deform the membrane if the membrane spring constant is low, whereas membranes with a higher spring constant k reduce the sensitivity (which is proportional to 1/k, k being proportional to the maximum pressure to be measured). These and other matters have presented challenges to the implementation of pressure sensors, for a variety of applications.

Various example embodiments are directed to pressure sensing apparatuses, circuits and systems, and methods for the same including their implementation.

According to an example embodiment, an integrated circuit apparatus includes an integrated circuit substrate having a cavity, a suspended membrane that forms a wall of a chamber at least partially in the cavity, an actuator that causes movement of the membrane relative to the cavity, and a sensor that detects a frequency-based characteristic of the membrane. The chamber has a variable volume for containing gas, with movement of the membrane changing the volume. The membrane has a plurality of openings that pass gas into and out of the chamber, and moves in response to an actuation force. The actuator generates a force with a controlled frequency that causes movement of the membrane relative to the cavity, in response to an electrical control signal carried in the integrated circuit, and thereby changes the volume of the chamber and generates a gas pressure inside the chamber that is different than a pressure outside the chamber. The sensor detects a frequency-based characteristic of the membrane responsive to the change in volume, which influences the force of gas upon the membrane, and therein provides an indication of the gas pressure in the chamber.

Another example embodiment is directed to an integrated circuit pressure sensor having a gas chamber, an actuator and a sensor. The gas chamber has walls that contain a gas, with the walls including a membrane that has an electrode that controls the force generated by an actuator. The force acts on the membrane, causing a membrane movement to change the volume of the chamber in response to a bias applied to the electrode. The membrane has a plurality of openings and flows gas via the openings to equilibrate pressure between gas in the chamber and gas outside of the chamber, flows gas into and out of the chamber when the membrane is actuated below a threshold frequency, and in response to the membrane being actuated above the threshold frequency, mitigates substantially all gas flow via the openings. The actuator circuit applies a time-varying actuation bias to the membrane via an electrode, to cyclically actuate the membrane and therein reduce and enlarge the volume of the chamber. The sensor is responsive to the actuator circuit actuating the membrane at a resonant frequency of the membrane, by detecting a resonance frequency shift (e.g., relevant to a reference) of the membrane based on the electrical impedance of the sensing element, and providing an indication of the pressure in the chamber based upon the detected shift in resonance frequency. In response to the actuator circuit actuating the membrane and pumping gas through the openings, the sensor provides an indication of the pressure in the chamber based upon viscous flow of the gas through the openings. In various implementations, the sensor provides an indication of the pressure in the chamber based upon at least one of: a frequency at which the membrane amplitude starts to decrease and the membrane amplitude or phase at a particular frequency, as indicated via an impedance between the electrodes.

Another example embodiment is directed to a pressure sensor apparatus including a cavity having sidewalls, a membrane that forms one of the sidewalls, an actuator and a sensor. The membrane has a plurality of openings therein, the openings being of a size that prevents substantially all gas flow through the opening when the membrane is actuated at or above a resonant frequency, and that facilitates gas flow through the opening when the membrane is actuated below the resonant frequency. The actuator cyclically actuates the membrane to rapidly compress and expand gas in the cavity. The sensor detects a frequency-based characteristic of the membrane responsive to the cyclic actuation, and provides an output indicative of the pressure at the membrane based on the detected frequency-based characteristic.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
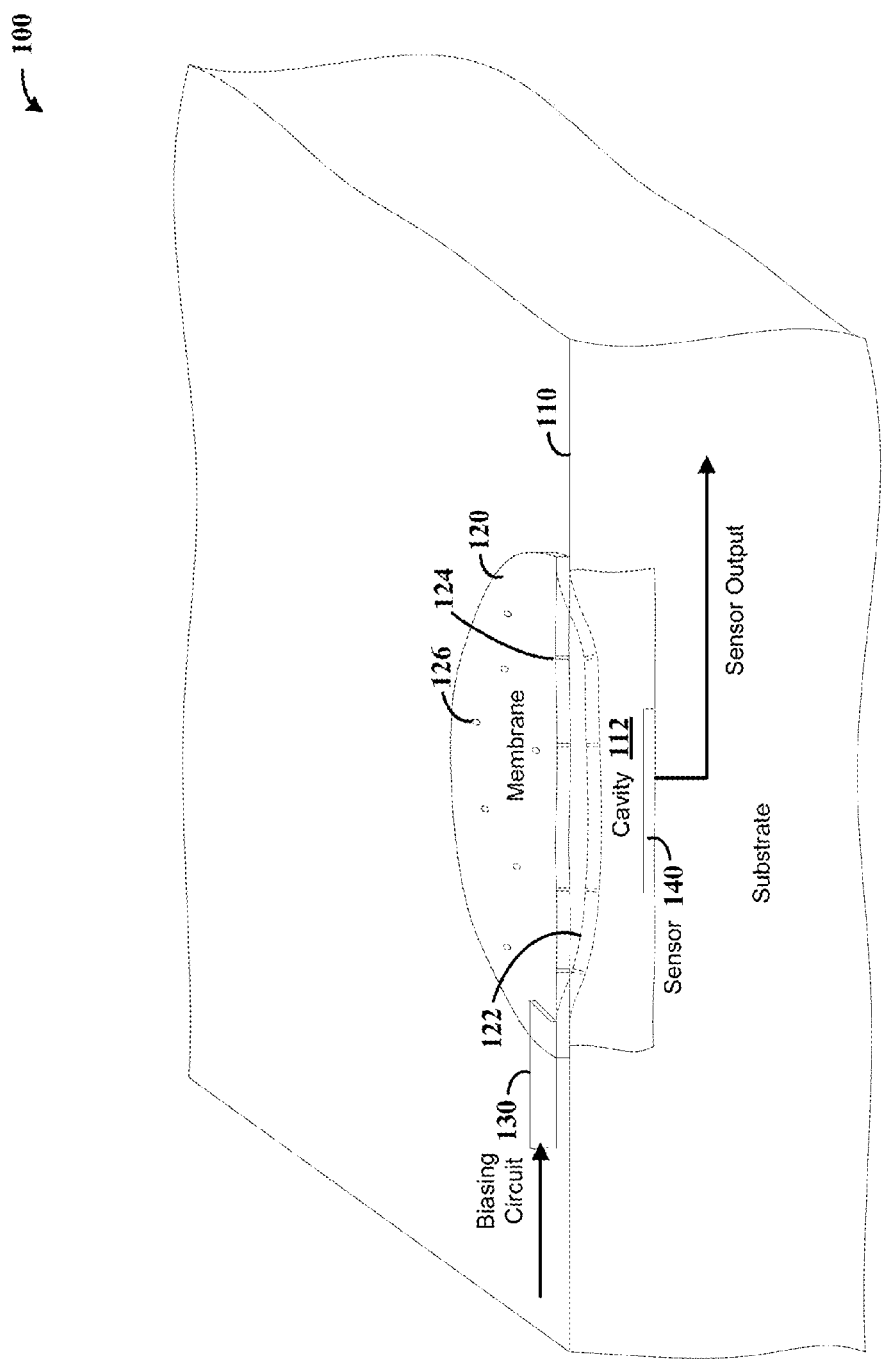
FIG. 1 shows a cross-sectional view of a pressure sensor apparatus, according to an example embodiment.

While the embodiments herein are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the various embodiments are believed to be applicable to a variety of different types of devices, systems and arrangements involving pressure sensing. While the present invention is not necessarily so limited, various aspects may be appreciated through a discussion of examples using this context.

Various embodiments are directed to a membrane-based pressure sensor in which actuation of the membrane changes a volume of a chamber in which the membrane forms a sidewall. The membrane includes a plurality of openings that facilitate and mitigate gas flow into and out of the chamber, based upon an actuation frequency (or lack thereof) of the membrane. Specifically, the openings facilitate equalization of pressure in the chamber with pressure outside the chamber when the membrane is static (or, e.g., operated at low frequency). As the membrane is actuated more rapidly, the openings mitigate gas flow via viscous interaction of the gas with the openings, and prevent gas flow at or near a resonant frequency of the membrane. Accordingly, a frequency-based characteristic of the membrane is detected and used as an indication of gas pressure in the chamber.

In one implementation, the membrane is actuated at a resonant frequency, and a shift in the resonant frequency is used to detect an indication of pressure in the chamber. In another implementation, the membrane is actuated at a frequency (or frequencies) below the resonant frequency, and (viscous) flow resistance of gas through the openings is used as an indication of pressure in the chamber. This approach uses an air pumping effect, and the frequency where the membrane amplitude starts to decrease and/or the membrane amplitude at a specific or several frequencies is/are used to detect an indication of pressure in the chamber.

For example, when the membrane of the chamber is actuated, the volume of the chamber is changed and the air inside the chamber is compressed or expanded. The compressed or expanded air has the tendency to equalize the pressure difference by flowing through the venting holes out of or into the chamber. This equalization is slowed via the shear viscosity and the finite size of the venting holes. The pressure relaxation time $\tau$ depends on many factors such as the air pressure and the number and the size of the venting holes. The air flow through tube-like venting holes is given by the flow resistance of the hole and the pressure difference, with the flow resistance having the form: $R=8\eta L/\pi r^4$ in which r is the tube radius, L is the length of the tube (with L>>r), and $\eta$ is the shear viscosity of the air. For chambers with a thin air gap along the movement of the membrane, the air flows along this gap, which can cause a large flow resistance that can be accounted for.

In various embodiments, a large shift in the resonance frequency (e.g., about 2.2×) of a membrane is achieved in a pressure range between about 0 bar and 1 bar. At high actuation frequencies the small venting holes prevent the air to flow significantly into and out of the chamber within one actuation period. The compressibility of the gas inside the very small volume (of the chamber) creates an additional spring constant to the resonating mass spring system, which shifts the resonance frequency to higher frequencies. Due to the membrane oscillations, the cavity volume is temporarily reduced and the resulting pressure is increased which creates a net force in the opposite direction. This is facilitated via the small volume with the number of molecules in the cavity held constant during an oscillation cycle.

The reciprocal of the resonance frequency $T_{res}$ (the cycle time) can be kept shorter than the pressure relaxation time $\tau$, where the membrane has a specific resonance frequency $f_{res}$ that depends on the membrane geometry and material (neglecting viscosities), to suit various implementations. The effect of air inside the chamber and air viscosity upon actuating the membrane is used to characterize the pressure. Periodic or short pulse actuations are used to actuate the membrane. At frequencies well below $1/\tau$, the membrane moves uninfluenced by the added air because it is only pumping the air in and out. At higher frequencies of around $1/\tau$, the viscosity of the air acts as a counter force to the air pumping effect and membrane actuation. The membrane actuation amplitude and the phase difference between the membrane actuation and membrane movement decrease. At higher frequencies, the air cannot follow the pumping action and is essentially not pumped, and is instead compressed and expanded. At the same time the damping is decreased because the effect of the volume viscosity of gases is usually much smaller than their shear viscosity.

There is a threshold frequency at which the membrane amplitude starts to decrease due to the increasing influence of the shear viscosity. With increasing frequency the membrane amplitude does not go to zero as the volume viscosity is usually much smaller than the shear viscosity. At the same time, the phase difference decreases and goes back to zero indicating reduced losses. As the frequency is further increased, the resonance frequency of the membrane is reached. The compression and expansion of the air volume causes a spring force in addition to the elastic forces of the membrane, which causes a shift in resonance frequency that depends on air pressure. For general information regarding MEMS sensors, and for specific information regarding MEMS resonator type devices and air flow/damping aspects, reference may be made to Sullen, Koning, van Gils, and Beijerinck, "Squeeze film damping in the free molecular flow regime with full thermal accommodation," Sens. Actuators A: Phys. (2009), which is fully incorporated herein by reference. In addition, for general information regarding the detection of resonant frequency, and for specific information regarding approaches to detecting a shift in resonant frequency that may be used in connection with one or more example embodiments, reference may be made to T. Nakamoto and T. Kobayashi, "Development of Circuit for Measuring both Q-variation and resonant frequency shift of quartz crystal Microbalance," IEEE Trans. Ultrasonics, Ferroelectrics and Frequency control, vol. 41, p. 806 (Nov. 1994), which is also fully incorporated herein by reference.

In connection with various example embodiments, a sensor apparatus compresses or expands gas and detects a speed characteristic thereof, and the detected speed characteristic is used to detect pressure. In a particular embodiment, a pressure chamber has a diaphragm-type membrane with openings therein that allow gas to flow into and out of the chamber. The openings are small enough such as to not significantly affect the generated pressure differences across the membrane during fast compression and expansion, but to flow gas to equilibrate long-term pressure differences across the membrane (e.g., as described above). The diaphragm-type membrane is actuated to rapidly compress or expand gas in the chamber and the speed of the equalization of the gas is detected after compression or expansion, such as by using a change in capacitance detection. The detected speed is used to determine a pressure external to the membrane.

The compression as discussed herein can be positive or negative. For instance, where the membrane positively compresses the gas in the chamber, the speed of the expansion of the gas, or other frequency-based aspects of the membrane actuation, is/are detected as the gas causes the membrane to move/increase the volume of the chamber. Where the membrane negatively compresses the gas (i.e., increases the volume of the chamber), the speed of the gas as it compresses upon release, or other frequency-based aspects of the membrane actuation, is/are detected. In each instance, pressure affects the resulting speed of the gas in expansion or compression, and the detected speed can be used as an indication of the pressure in the chamber and, therein, pressure outside the chamber (as has been equalized).

In some implementations, the sensor apparatus is formed as part of a semiconductor substrate having a portion thereof that forms a cavity. The membrane and cavity are arranged to form the chamber and trap gas therein. In this context, the cavity may be etched or otherwise formed in a substrate over which the membrane extends, such as in a layer of semiconductor substrate formed on an insulating layer. When the membrane is actuated out-of plane (e.g., relative to the substrate), the volume of the chamber is altered, compressing or expanding the gas in the chamber.

The sensor apparatus operates in one or more of a variety of manners, in accordance with various embodiments. In one embodiment, the sensor apparatus relates a frequency-based characteristic of the membrane and/or the speed of the gas to a number of gas molecules in the chamber. This number of gas molecules is used to characterize a pressure in the chamber. For instance, the number of gas molecules affects the amplitude of the membrane, damping of the membrane, and the speed of molecules after compression. In some implementations, the sensor apparatus relates the number of gas molecules in the chamber to a time averaged ambient pressure in the chamber over many compression-expansion cycles.

In another embodiment, the spring constant of the system is detected and used as an indication of pressure in (and accordingly external to) the chamber, as the number of gas molecules affects the force needed to compress them. In certain implementations, this approach is carried out by detecting the resonance frequency, which depends on the spring constant and is thus a function of pressure. Such a resonance-based approach is facilitated, in certain embodiments, using compression and expansion times much longer than the mechanical resonance period of the chamber. Overall, these approaches to pressure sensing can be carried out without using a reference cavity at fixed/known (gauge) pressure, and without sensing based on friction.

A variety of membranes are used to suit different applications. Device performance is set based on the mechanical properties of the membrane and the geometry of the chamber. The composition of the membrane and the membrane deposition parameters such as temperature and plasma power are selected to set the internal stress. The mechanical properties of the membrane (e.g., the mechanical stress, stiffness and membrane thickness) set the membrane rigidity and hence the sensitivity of the pressure sensor.

The membrane is actuated using one or more of a variety of approaches. In some implementations the membrane is actuated via electrostatic force. In other implementations, the membrane is actuated via piezoelectric force. In other implementations, the membrane is actuated using other (e.g., physical) forces.

The circuits and related approaches described herein are implemented in a variety of different types of devices to suit various applications. For instance, some applications are directed to microelectromechanical systems (MEMS) type devices such as a MEMS sensor platform, MEMS galvanic switch and MEMS microphone. Other applications are directed to one or more of mobile phones (e.g., for use with a microphone), weather stations, GPS applications (e.g., elevation), and watches. Certain automotive-based embodiments are directed to one or more of tire pressure monitoring systems (TPMS), air bags, shock registration devices, exhaust and engine/fuel related pressure detection. Still other embodiments are directed to environmental and smart building applications, such as for pressure detection in one or more of heating, ventilation, and air conditioning (HVAC) systems, air flow, gas detection (e.g., $CO_2$), and pressure drop over air filters. Medical applications include pressure sensing for inhalers, breathing devices, hearing aids or gas pressure.

Turning now to the figures, FIG. 1 shows a cross-sectional view of a pressure sensor apparatus 100, according to another example embodiment. The apparatus 100 includes an integrated circuit substrate 110 having a cavity 112 therein. A membrane 120 is suspended over the cavity and, with sidewalls of the cavity, defines a chamber region for containing a gas, such as air or other gas (and, e.g., may include a vapor). The membrane 120 includes a plurality of openings, with openings 124 and 126 labeled by way of example. These openings pass gas (e.g., a gas such as air) between the chamber region and the volume adjacent to the chamber. The size of the openings can be set for different applications, and in some embodiments are of a diameter of between about 100 nm and 2000 nm, and in other embodiments are less than about 2 nm.

The membrane 120 operates to deflect relative to the chamber for adjusting a volume thereof, with dashed lines showing a position 122 of the membrane corresponding to an example deflection that reduces the volume of the chamber. The actuation may, for example, be effected by an actuator including a biasing circuit 130, and may effect a single pulse (e.g., for deflecting the membrane as shown) or a time-varying cyclical actuation in which the membrane 120 is actuated at a particular frequency or frequencies. This bias may, for example, be controlled via a control circuit in the integrated circuit substrate, connected directly and/or via interconnects therein, and carry out actuation after pressure in the chamber has been equilibrated with that outside of the chamber. The openings in the membrane facilitate equalization of gas pressure inside and outside of the chamber (e.g., at a steady state), permit viscous flow of gas as the membrane is actuated at relatively low speed/frequency, and inhibit about all flow of the gas through the openings as the membrane is actuated at high speed/frequency (e.g., above a threshold frequency, near a resonant frequency) as facilitated via venting hole geometry and viscous effects. In this context, the membrane 120 operates about as if the volume of the chamber is sealed at high frequencies, facilitating the detection of the pressure of gas therein and, accordingly, the corresponding (equilibrated) pressure external to the chamber. At lower frequencies, the membrane 120 operates to flow gas viscously via the openings, with the viscosity of the gas and flow resistance of the openings (and including a number of openings) used to detect a pressure characteristic of the gas in the chamber. In some instances, the viscosity and flow resistance are also used as an indication of the composition of the gas, using a known pressure.

A frequency characteristic of the membrane is detected and used as an indication of pressure in the chamber. This characteristic may be detected, for example, via the biasing circuit 130, or via a separate sensor 140. In some implementations, the frequency characteristic is detected as a shift in resonant frequency of the membrane (e.g., when the openings pass little or no gas), or as related to a pumping effect of the gas in the chamber (e.g., by identifying a frequency at which the amplitude of the membrane 120 starts to decrease, or the membrane amplitude at a particular frequency, as indicated via the electrical impedance of the sensing element). Such aspects may also relate to a speed of expansion/compression of gas in the chamber.

Figure 2:
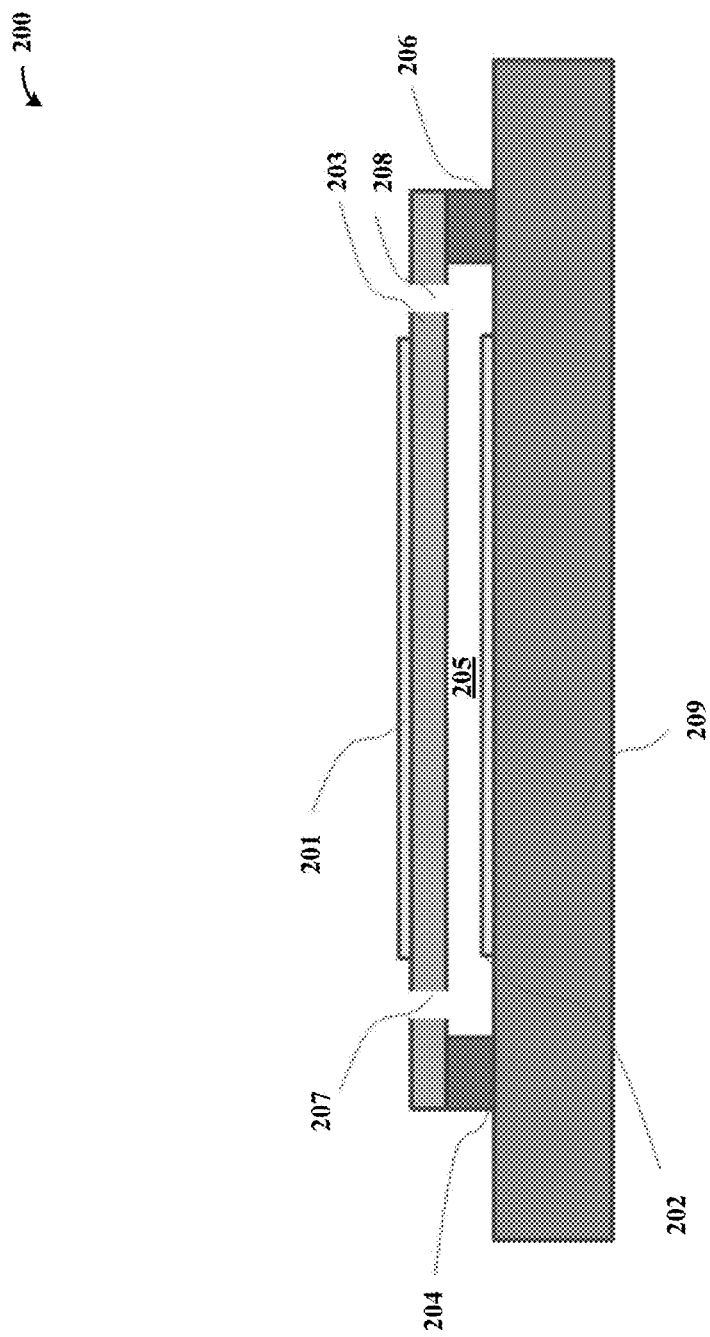
FIG. 2 shows a cross-sectional view of another pressure sensor apparatus, in accordance with another example embodiment.

FIG. 2 shows a cross-sectional view of another pressure sensor apparatus 200, in accordance with another example embodiment. The apparatus 200 includes a membrane 203 having openings 207 and 208 therein, and forming a sidewall of a chamber/gap region 205 defined by the membrane and substrate regions 204, 206 and 209, in which 204 and 206 anchoring the membrane to the underlying substrate 209. Electrodes 201 and 202, respectively on the membrane 203 and substrate 209, operated to actuate the membrane 203 (with a bias applied to electrodes 202 and 201). In various implementations, an impedance indicated between the electrodes is used as an indication of a frequency characteristic of the membrane 203, such as deflection thereof, and is therein used to detect a pressure in the chamber.

In vacuum, the spring constant depends on the material parameters and geometry of the membrane 203, including the openings therein. At higher external pressures, gas enters the narrow gap region 205 via the openings. If the resonance frequency of the membrane is high enough, the small holes in 203 and narrow gap region 205 in combination with the gas' viscosity prevent the gas from substantially leaving the cavity region in one resonance period. As a consequence the amount of gas stays about constant, such that the ideal gas law is applicable to the apparatus 200. For fast expansion and compression, heat exchange can be neglected, such that the gas is adiabatically compressed and expanded. Therefore, it is approximately valid that $P*V^\gamma$=constant, where $\gamma$ is the adiabatic index which is approximately 7/5 for a diatomic gas (like the nitrogen and oxygen in air). If the downward membrane deflection (as represented at 122 of FIG. 1) is equal to $\Delta z$ over its whole area A (piston mode model), this corresponds to a spring with spring constant $k_{gas}=-A\,dP/dz=A*d(P*V^\gamma/V^\gamma)/dz=-A*P*V^\gamma d((A\,z)^{-\gamma})/dz=\gamma P*A/z$. As an example, for a 100 micron radius membrane with a gap of $z_0$=300 nm and at atmospheric pressure (P=100 kPa), $k_{gas}$=15000 N/m.

In some embodiments in which displacement is not equal at every point on the membrane, a correction factor $\alpha$ is used as follows.

$$k_{gas}=\alpha\gamma P*A/z_0 \quad (1)$$

The correction factor is selected based upon the mode shape of the resonance.

The resonance frequency thus depends on the external pressure, because the gas inside of the cavity acts as a spring. The total spring constant of the gas and membrane is approximately given by:

$$k_{total}=k_{mem}+k_{gas} \quad (2)$$

Since the effective (or distributed) mass m and spring constant $k_{mem}$ of the membrane are independent of pressure and $k_{gas}$ is proportional to the pressure, the resonance frequency $f_{res}$ is also dependent on pressure, as shown in equations 3 and 4 as $$f_{res}=((k_{mem}+\gamma PA/z_0)/(4\pi^2 m))^{1/2}=f_0(1+\alpha\gamma PA/(k_{mem}z_0))^{1/2}, \text{ and} \quad (3)$$

$$df_{res}/dP=f_0^2\alpha\gamma A/(2f_{res}k_{mem}z_0), \quad (4)$$

in which $f_0$ is the resonance frequency of the sensor in vacuum. Equation (3) shows that the pressure sensitivity of the device is maximal for a large ratio of area A to gap $z_0$ and a small spring constant $k_{mem}$ (e.g., for small membrane thickness and/or low stress). In order to mitigate/prevent gas from leaving the cavity within one period, a high frequency $f_0$ (low m and high $k_{mem}$) and small gap $z_0$ are used, together with relatively few small holes (holes 207 and 208 shown in the cross-section of FIG. 2) that are well spaced from one other and from the center of the membrane.

If the membrane 203 is resonating at a frequency f, which is high enough to prevent the gas from having time to escape from the cavity including gap region 205, the pressure $P_g$ of the gas in the gap 205 is modulated at frequency f with an amplitude proportional to the membrane displacement ($|\Delta P|=k_{gas}|\Delta z|/A$), such that $P_g(t)=P_0+|\Delta P|\sin(2\pi f\,t)$. The pressure difference $P_g-P_0$ causes an amplitude dependent force $(F=(P_g-P_0)A)$ on the membrane which acts as an effective spring constant $k_{gas}$.

In some embodiments, the membrane 203 includes a 700 nm SiN layer formed using PECVD, the electrodes 201 and 202 include 250 nm thick metal electrodes including, e.g., W, TiN, or Al, and the gap size $z_0$ (at 205) is 300 nm. The holes (including 207, 208) have a diameter of about 2 μm and are distributed along the edge of the membrane 203. In some implementations, the membrane 203 is a circular membrane having a diameter in the range of 25 μm to 90 μm. In other implementations, the membrane 203 is a rectangular or square type membrane, and can be implemented with a surface area that is similar to that of the aforementioned diameters with the circular membrane.

Figure 3:
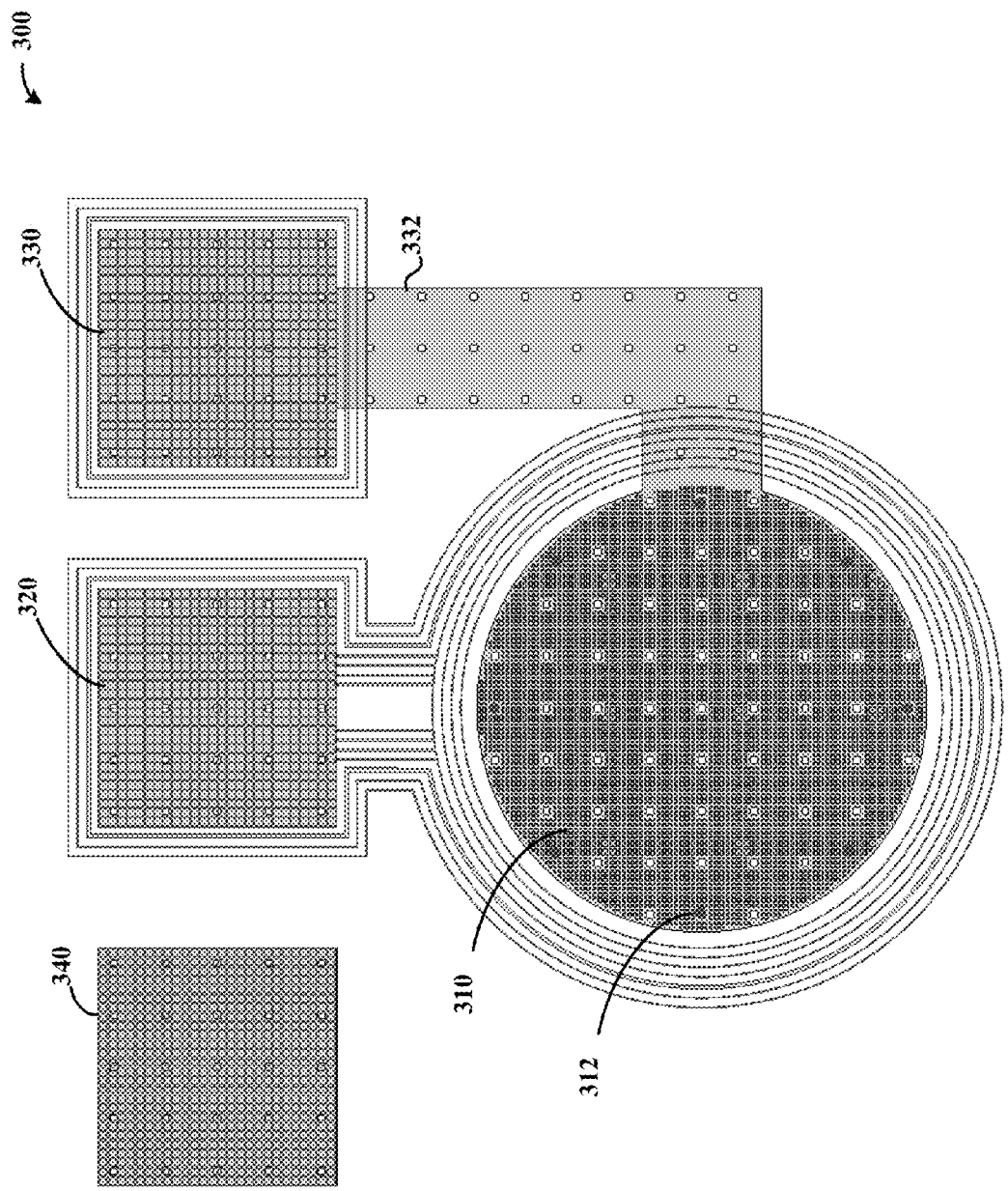
FIG. 3 shows a top view of a resonant pressure sensor with a resonant membrane having sacrificial holes, in accordance with another example embodiment.

FIG. 3 shows a top view of a resonant pressure sensor 300 with a resonant membrane 310 having sacrificial holes 312, in accordance with another example embodiment of the present invention. The sensor 300 includes top electrode contact 320 coupled to an electrode on the membrane 310 (e.g., similar to electrode 201 of FIG. 2), and a bottom electrode contact 330 coupled to a bottom/biasing electrode of the sensor 300 (e.g., similar to electrode 202 of FIG. 2). A ground electrode 340 is coupled to ground a substrate in which the sensor 300 is formed. By way of example, eight venting holes are shown (312 labeled), and are located near an outer perimeter of the membrane 310.

Figure 4:
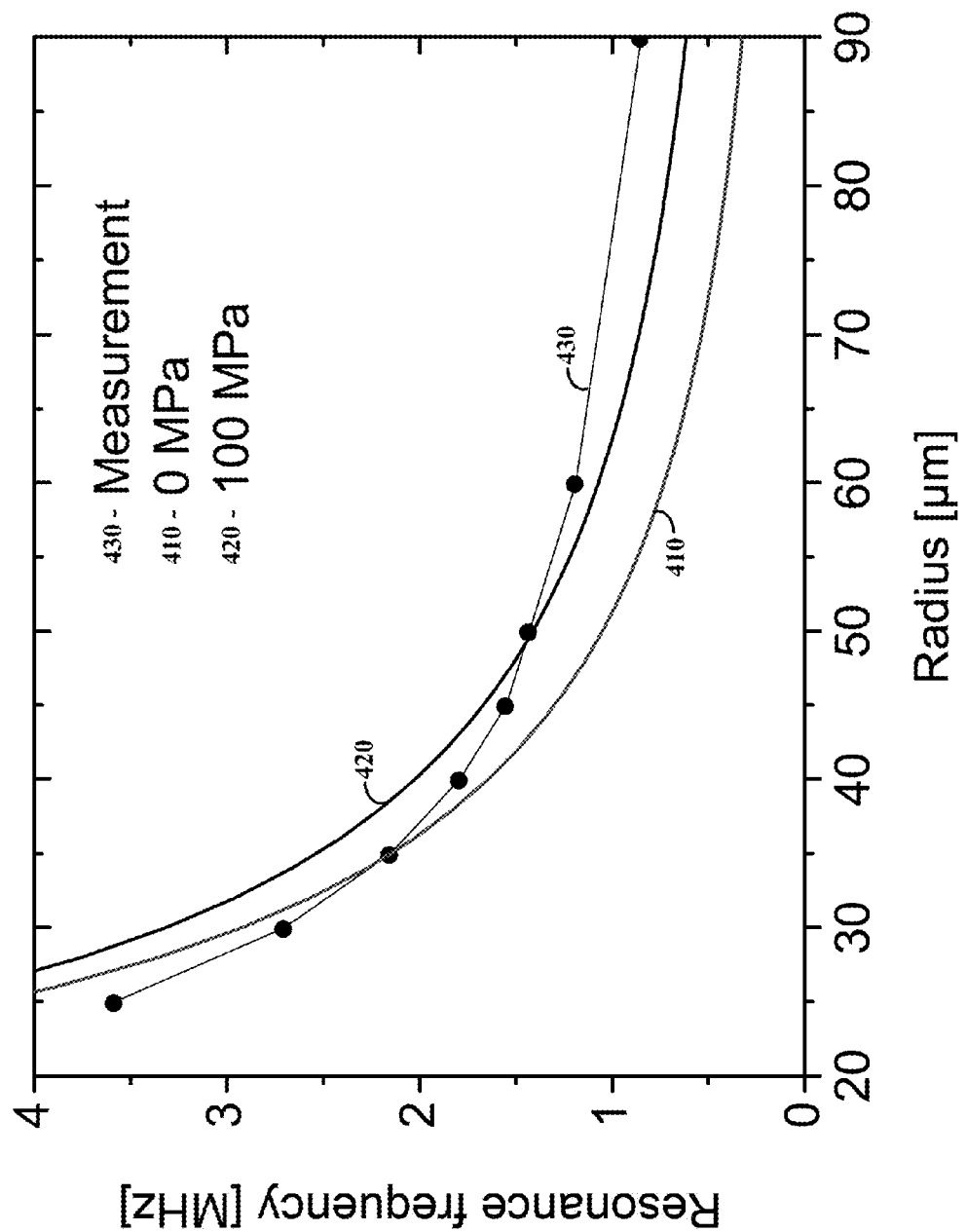
FIG. 4 shows plots of the resonance frequency as a function of membrane radius, as may be implemented in accordance with another example embodiment.

FIG. 4 shows plots of the resonance frequency as a function of membrane radius, as may be implemented in accordance with one or more embodiments. For smaller diameters the resonance frequency increases as the membrane behaves in a stiffer manner, relative to larger diameters. Plot 410 shows the resonance frequency for a mechanical stress in the membrane of 0 MPa and plot 420 shows the resonance frequency for a stress of 100 MPa (tensile stress). Plot 430 shows a measured resonance frequency for example membrane diameters.

Figure 5A:
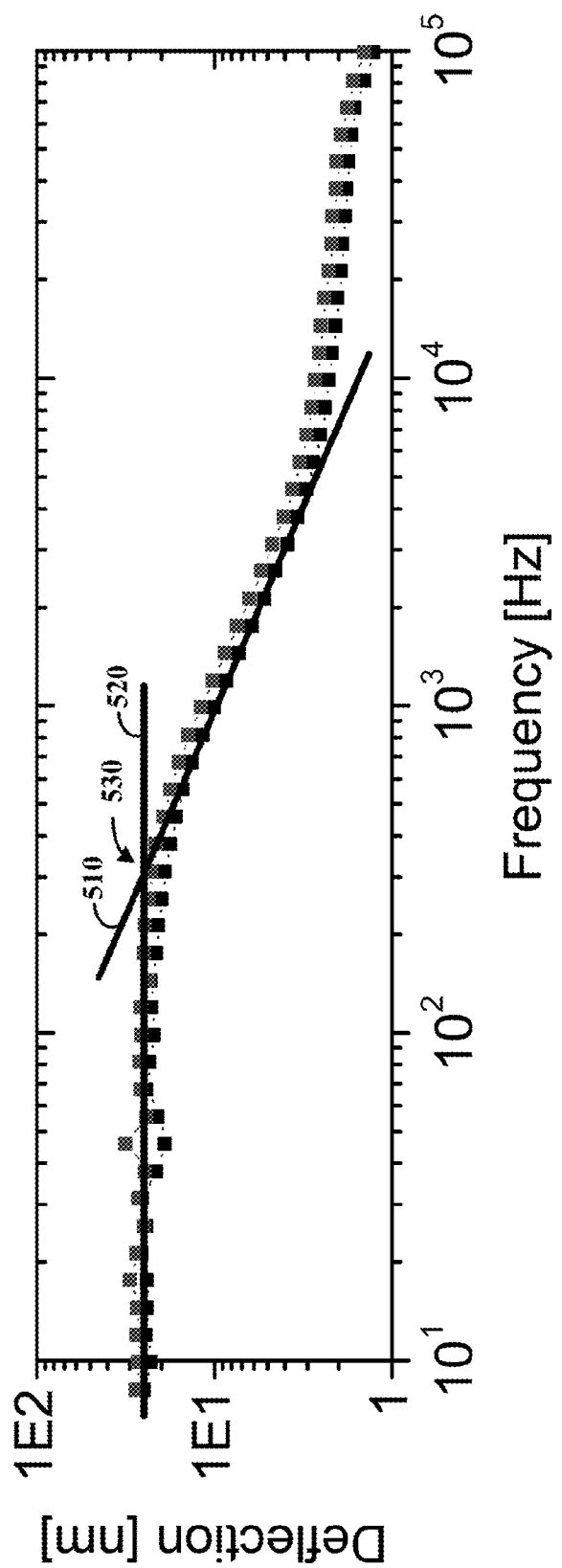
FIG. 5A shows the deflection of the center of a membrane by electrostatic actuation as a function of the actuation frequency, in accordance with another example embodiment.
Figure 5B:
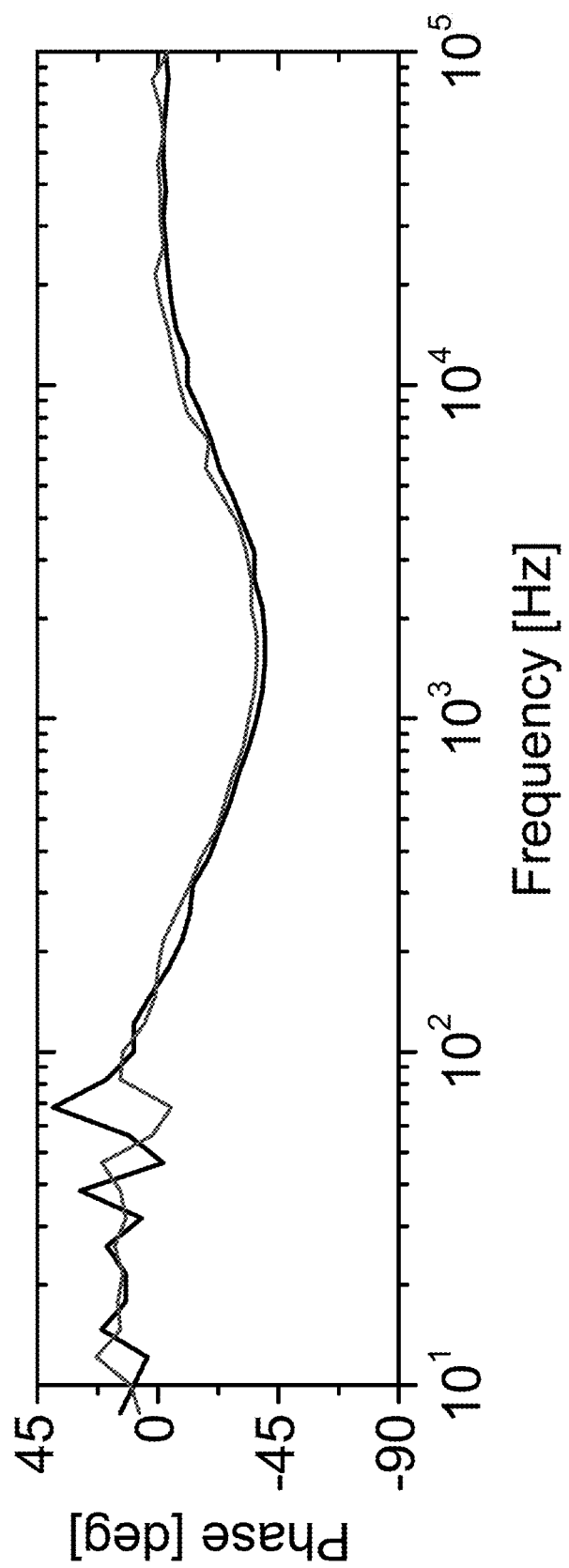
FIG. 5B shows the phase between the actuation voltage and the membrane deflection corresponding to the deflection shown in FIG. 5A, in accordance with another example embodiment.

FIG. 5A shows the deflection of the center of a membrane with electrostatic actuation, and FIG. 5B shows related phase, in accordance with other example embodiments. Specifically, amplitude and phase of the deflection are plotted as a function of the actuation frequency for a 90 µm radius membrane in ambient pressure, for a membrane as may be implemented as shown in FIGS. 1, 2 and/or 3. The increased noise at around 50 Hz is due to mechanical vibration of the measurement setup. The cross point of both lines 510 and 520 indicate the cut-off frequency (530). The sinusoidal actuation has an amplitude of 2 V and the bias voltage is 8 V (lower squares) and 10 V (upper squares).

At low frequencies, the deflection amplitude is not limited by the gas in the chamber and the deflection is in phase with the actuation. The movement is so slow that the gas is pumped through the holes (e.g., 207, 208 of FIG. 2). At frequencies of around 200 Hz, the amplitude starts to drop because of increased damping of the gas while flowing through the thin gap in the chamber (e.g., 205 of FIG. 2). The damping depends on the geometry and the inner surface properties of the gap and the shear viscosity of the gas. The damping also causes an increase of the phase delay. These damping effects as applied via pulse or cyclic actuation of the membrane are detected and can be used to detect a frequency-based characteristic of the membrane indicative of pressure. At frequencies above 10 kHz, the damping of the gas is so high that it cannot flow in and out the gap region during one period. As a consequence, with increasing frequency, the lateral air flow through the gap is reduced. Because less air is flowing and because of the low volume viscosity of gases, the damping forces decrease again. At these frequencies the compression forces of the air inside the gap become dominant. Since volume viscosity is usually smaller than shear viscosity, the phase of the deflection goes back to zero indicating reduced damping. The compression of the gas is measured as a constant deflection amplitude at frequencies above 10 kHz.

Figure 6:
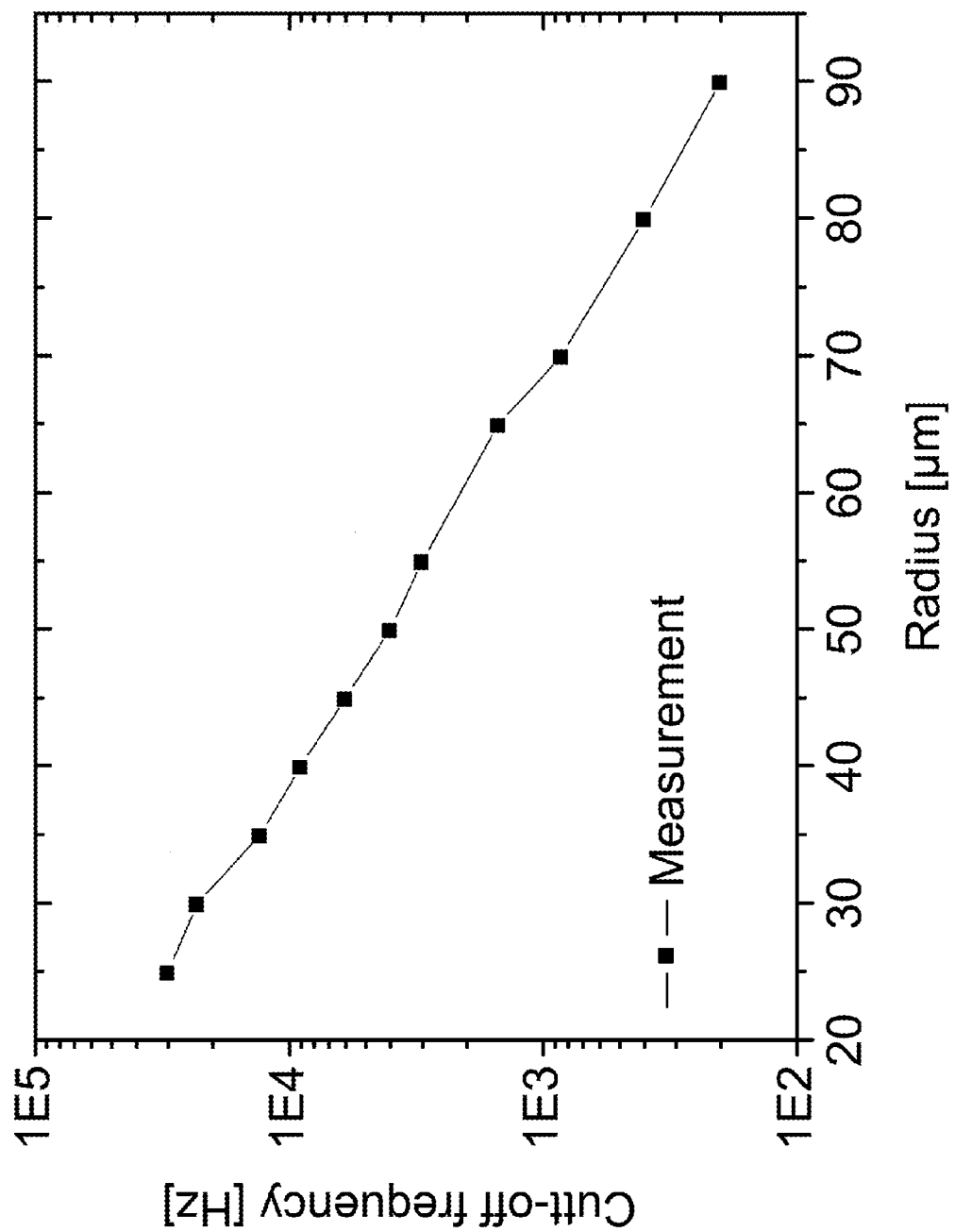
FIG. 6 shows a plot of cut-off frequency as a function of membrane radius, as may be implemented in accordance with another example embodiment.

For devices with a smaller radius, the distance between the center of the membrane and the holes is less, such that the cut-off frequency (530) where lines 510 and 520 intersect, at which the gas does not have enough time to leave the resonator gap, is increased. FIG. 6 shows a plot of cut-off frequency as function of membrane radius, as may be implemented in connection therewith.

Figure 7:
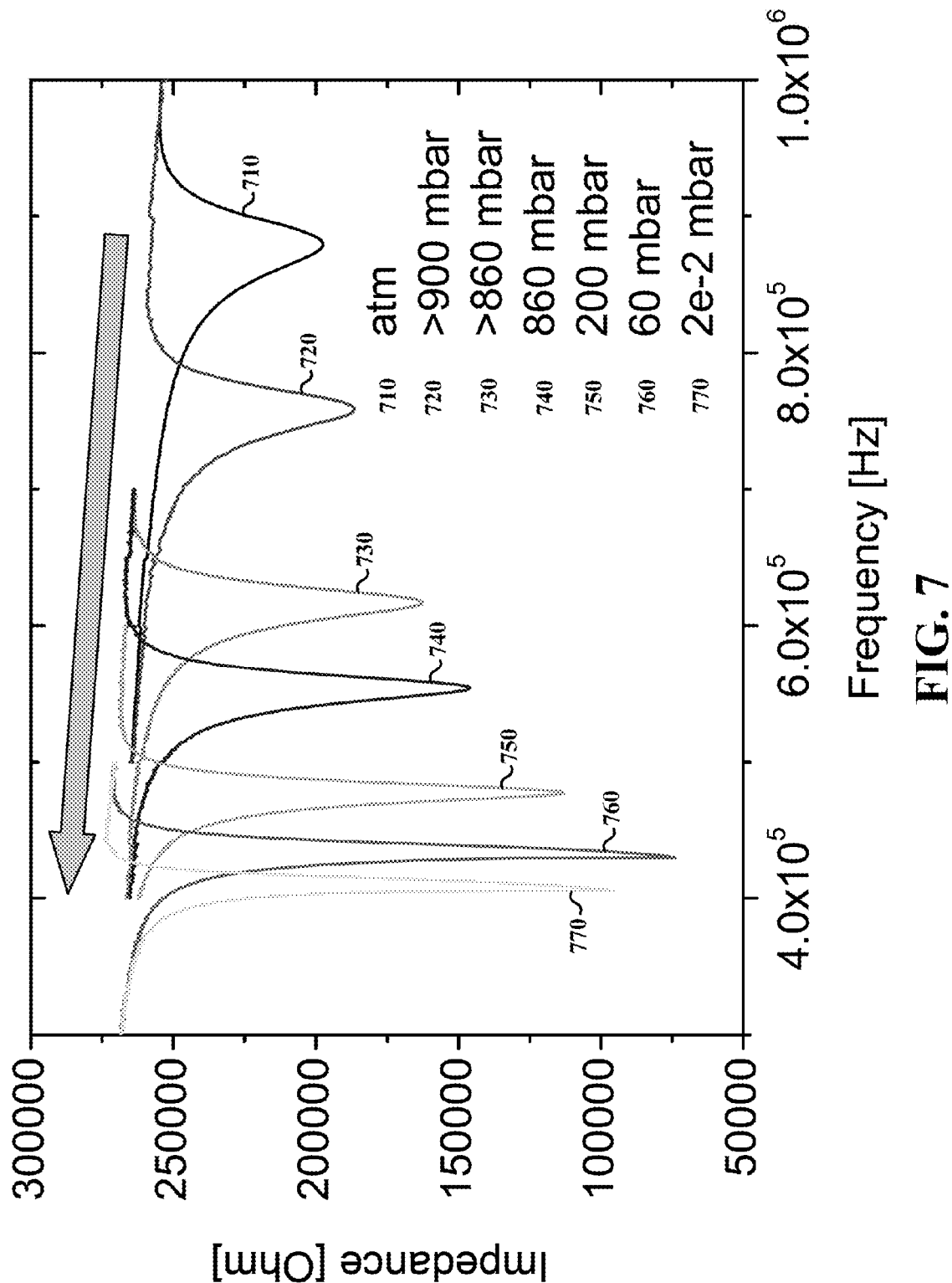
FIG. 7 shows plots of impedance for different pressures as a function of frequency, as may be implemented in accordance with one or more example embodiments.

FIG. 7 shows plots of impedance for a 90 µm membrane diameter as function of frequency, showing the shift in the resonance frequency due to variations in gap pressure as implemented in accordance with one or more embodiments. Respective plots are shown at atmospheric pressure (710), above 900 mbar (720), above 860 mbar (730), 860 mbar (740), 200 mbar (750), 60 mbar (760), and $2e^{-2}$ mbar (770). When increasing the pressure from 0 to 100 kPa, the resonance frequency increases by a factor of 2.2. The resonance frequency is measured, for example, by measuring the electrical impedance between actuation electrodes (e.g., as shown in FIG. 2) as a function of frequency while applying a DC bias voltage, $V_{dc}$, across the membrane. The membrane is excited by the electrostatic force and its motion is detected by measuring the capacitive current (the capacitance between the electrodes 201 and 202 is a function of the distance $z_0+\Delta z$).

In some embodiments, a feedback loop having an amplifier is used to create a MEMS oscillator, which continuously generates an AC output signal with a frequency which depends on the external pressure. The frequency of the output signal is a measure for the pressure. The frequency is determined using one or more of a variety of manners in which to measure resonance frequencies of MEMS, mechanical resonators, or RLC circuits.

As shown by equation (3) above, the measurement can be made over a large range of pressures and becomes more sensitive at higher pressures. However, at low pressures, the gap $z_0$ in the chamber can be made small, with the area A large, $k_{mem}$ small and the frequency $f_0$ high enough to prevent gas from being pushed out due to the resonating membrane. In some embodiments, an array of pressure sensors having different sensitivity ranges with respect to physical properties such as diaphragm size, hole diameter and chamber size are combined to provide a broad sensitivity range. In certain embodiments, pressure sensing as discussed herein is combined with implementation of a measurement of the Q-factor of the resonance, such as discussed in connection with the Nakamoto reference cited above.

In accordance with various example embodiments, a calibration approach is used to calibrate a pressure sensor as discussed herein, such as to accommodate for shift in resonance frequency of the membrane, as may be resultant from variations in process conditions such as may involve non-uniform membrane thickness. In some implementations, the resonance frequency of the membrane is determined at a reference pressure to see if there is a shift. Other implementations are directed to checking if a "base" pressure resonance frequency has shifted, by using devices with different size or hole density; if the hole-to-hole distance is small enough, the fundamental resonance frequency will become independent of pressure and any mass differences or changes in the membrane can be accurately determined and be used to correct the calibration of the pressure sensitive membrane. Still other implementations are directed to using a frequency sweep to determine a cut-off frequency (e.g., as 530 in FIG. 5A above) at which pressure starts to play a role in the spring constant on the total mass spring system, to determine a calibration curve at a reference pressure and later use the curve to determine the ambient pressure, e.g., from the cut-off frequency.

In other embodiments, calibration is effected to account for the effect of temperature on the resonance frequency, as may be based upon the coefficient of thermal expansion of the materials, which results in a shift of the resonance frequency (temperature changes of Young's modulus can be much smaller than effects of thermal expansion). This shift can be corrected for using a temperature sensor and a look-up table. In some cases humidity might have an effect of the mass or spring constant of the device. The resultant changes due to humidity might also be corrected by a humidity sensor and look-up table. The calibration data in the look-up table are obtained from calibration or models.

In certain embodiments, the effect of changes in humidity upon the pressure sensor is mitigated. For example, the resonator membrane is coated with a hydrophobic coating in certain implementations. In other implementations, the surface roughness and porosity of the membrane is reduced.

In another embodiment, multiple higher resonance frequencies ($f_1, f_2, f_3, \ldots$) of the same membrane are measured and used to effect calibration. Since the effect of mass or spring constant variations on the resonance frequency will be different from the effect of pressure on the resonance frequency, the ratio of resonance frequencies, e.g., $f_2/f_1$, $f_3/f_2$, is used to distinguish the effect of mass loading from a pressure change. In essence, the lowest membrane mode ($f_1$) will be much more sensitive to pressure than the higher modes (which require much less cavity volume changes). All modes depend on mass and spring constant approximately as sqrt(k/m).

A variety of approaches can be used to manufacture a sensor apparatus as discussed herein. In some embodiments, a bottom metal electrode is deposited (e.g., 200 nm thick PVD Al) and subsequently patterned on a substrate, such as a plain isolating layer of silicon oxide or silicon nitride on a bare silicon wafer, or an isolating layer on top of a CMOS wafer with integrated electronic circuitry underneath. An isolating silicon nitride or silicon oxide is deposited conformally on top using PECVD or LPCVD, followed by the deposition of a sacrificial layer (e.g., a 300-500 nm thick metallic layer such as Mo, Al or Cr) that is patterned in an appropriate circular shape with flaps in order to access this layer outside a circular membrane area for a sacrificial etch. A larger sacrificial film thickness can be used to create a larger gap and a smaller spring constant, with an overall a smaller sensitivity. A smaller thickness can be used to measure also lower gas pressures. The sacrificial layer deposition is followed by the deposition of a uniformly deposited silicon nitride or oxide capping layer (e.g., 200-300 nm thick). A thin top metal electrode (Al) is deposited on top and subsequently patterned. Thinner electrodes (e.g., 100 nm-200 nm) can be used to achieve a smaller temperature expansion coefficient. The electrode is then capped with a PECVD silicon nitride or oxide layer.

Figure 8:
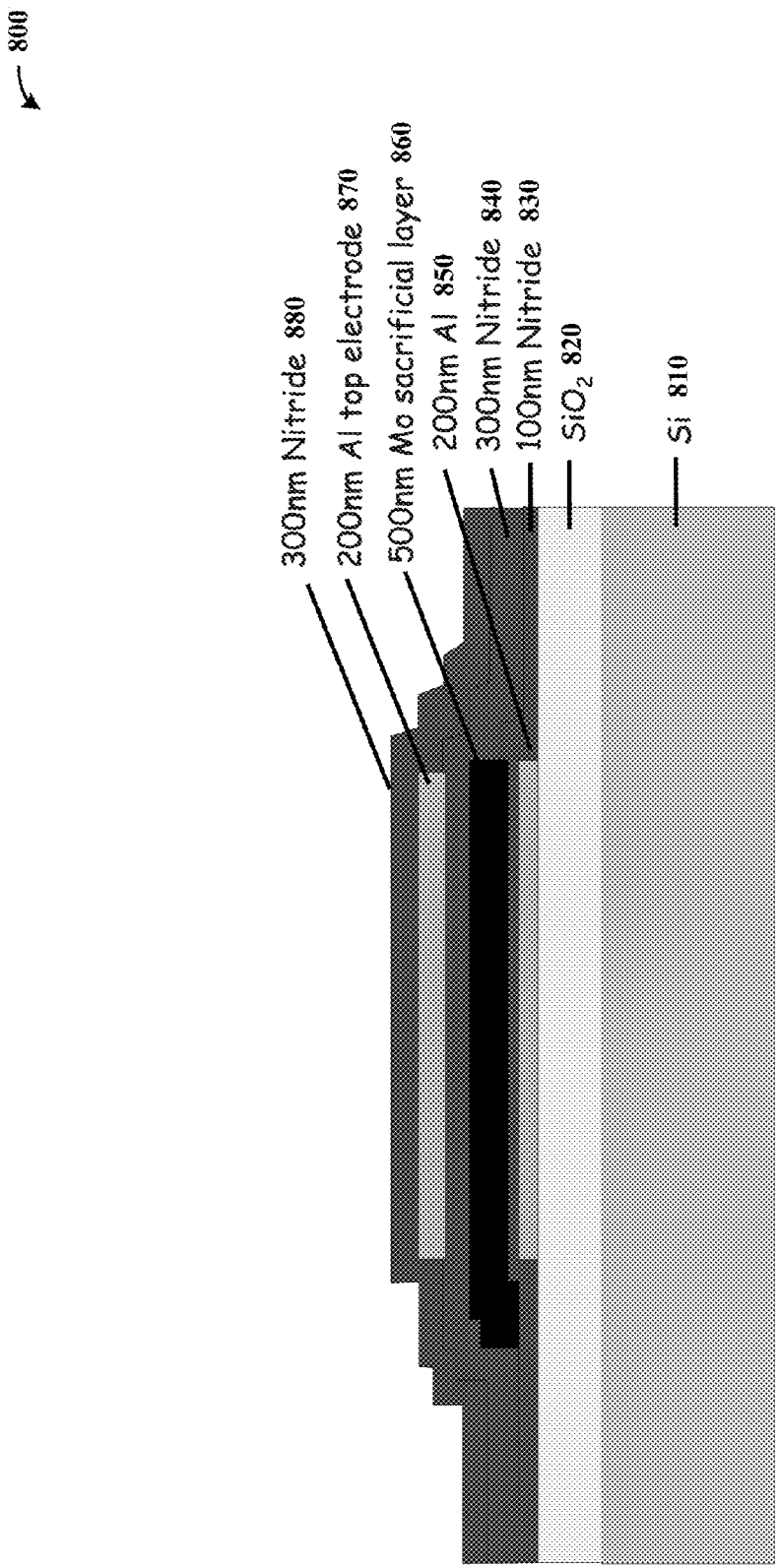
FIG. 8 shows a pressure apparatus at step in a process flow for forming a pressure sensor, in accordance with another example embodiment.

FIG. 8 shows a pressure apparatus 800 at step in a process flow for forming a resonant pressure sensor, in accordance with a particular embodiment. The apparatus 800 may be formed in accordance with the approach discussed above, beginning with a substrate 810, insulating layer 820, respective nitride layers 830 and 840, bottom electrode 850, sacrificial layer 860, top electrode 870, and nitride cap 880. The process flow is continued with the patterning and dry etching of holes stopping on the sacrificial layer 860, circumferentially around the membrane (e.g., with openings such as openings 312 shown in FIG. 3, of 2 μm in diameter).

Figure 9:
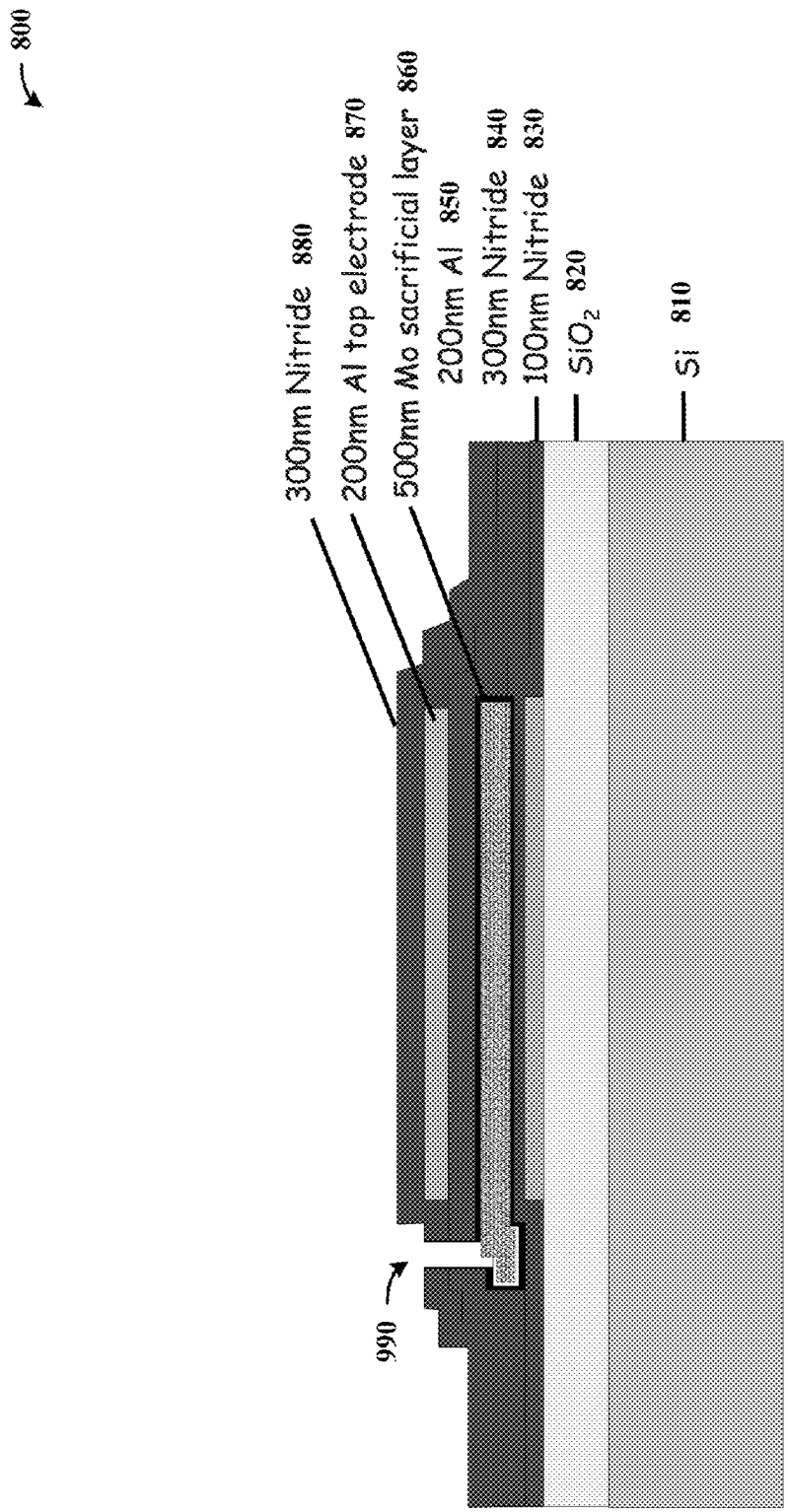
FIG. 9 shows the apparatus of FIG. 8 at a further step, in accordance with another example embodiment.

FIG. 9 shows the apparatus 800 at a further step in which a cavity has been formed during etch of the sacrificial layer 860, via opening 990. In some embodiments, a Mo-based sacrificial layer is selectively removed with a PES etch (mixture of Phosphoric acid, Sulfuric acid, Acetic acid). In some implementations, the apparatus 800 is further capped with a layer (e.g., SiN) over the layer 880, to mitigate contamination of the resonating membrane. Electrical connections and bond pads to the top and bottom electrode for actuation are created by subsequent patterning, etching and deposition.

A variety of membrane types are used to suit particular applications. In some embodiments, graphene or other membranes of less than about 2 nm in thickness, or only a few atoms thick (such as boron nitride or molybdenum disulfide) are used for applications in which small flexural rigidity is desired. The tension/spring constant in the membranes can be lower due to small thickness (h), such that the product of built-in stress (σ) times thickness is very small (k=4πσh). As a consequence, membranes of a much smaller size can be used to achieve a similar spring constant. For instance, graphene membranes are implemented to obtain a similar pressure sensitivity (dz/dP) as that of membranes with much smaller (100-1000× smaller) area. In other embodiments, semipermeable membranes or membranes with micropores/nanopores are used. Since such membranes have a different permeability for different gases, they can be made selective to the partial pressure of different gases, and thus be used to determine the ratio of gases in a mixture by comparing the pressure reading of sensors with different semipermeable membranes.

Other embodiments are directed to apparatuses including a pressure sensor and ohmic MEMS switches, which can be processed using a similar process flow. By combining the sensor and the switch, several pressure sensors with different diameters can be made in the same device. The switches are then used to switch between different pressure sensors, as larger membranes are more sensitive at lower pressures and smaller membranes are more sensitive at higher pressures. With this approach, cost-effective processing with low capacitance can be achieved with reduced parasitic capacitances and a very broad pressure range on a small substrate area.

Figure 10:
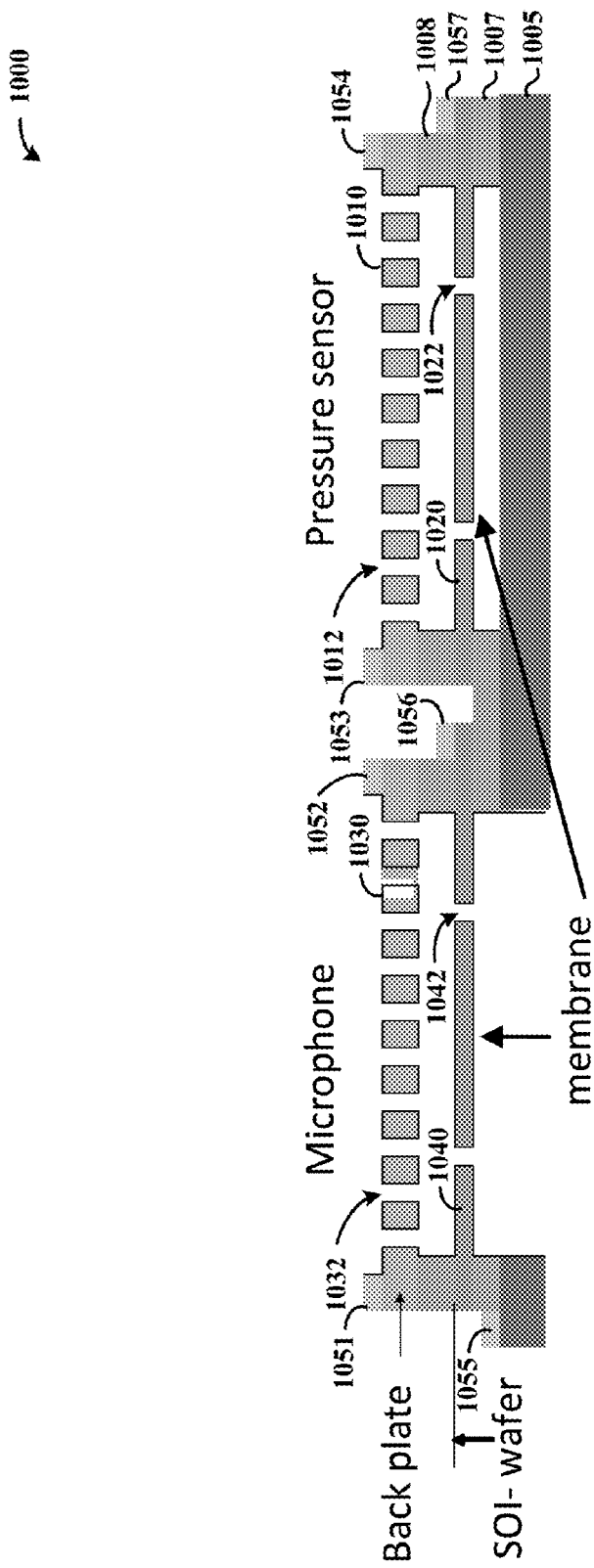
FIG. 10 shows an apparatus combining a pressure sensor with a MEMS microphone, in accordance with another example embodiment.

FIG. 10 shows an apparatus 1000 combining a pressure sensor with a MEMS microphone, in accordance with another example embodiment. The apparatus 1000 includes a MEMS pressure sensor having a membrane 1020 with openings 1022 therein, on a common integrated circuit substrate 1005 (e.g., silicon) with a MEMS microphone having a membrane 1040 with openings 1042 therein. The membranes are supported by a silicon oxide material 1007 and 1008. A back-plate has regions 1010 and 1030 (e.g., polysilicon) respectively over the pressure sensor and microphone membranes, and with openings 1012 and 1032 patterned therein. Electrodes (e.g., gold) 1051-1057 are located as shown. In order to obtain a large resonance frequency when the membrane is made of silicon, the diameter of the pressure sensor can be chosen between 50-100 um. The membrane 1020 can, for example, be actuated via a bias applied by the back plate 1010. In some implementations, the pressure sensor is much smaller than the diameter of the microphone (e.g., 1 mm), and is manufactured in the corners of the MEMS microphone die.

Figure 11:
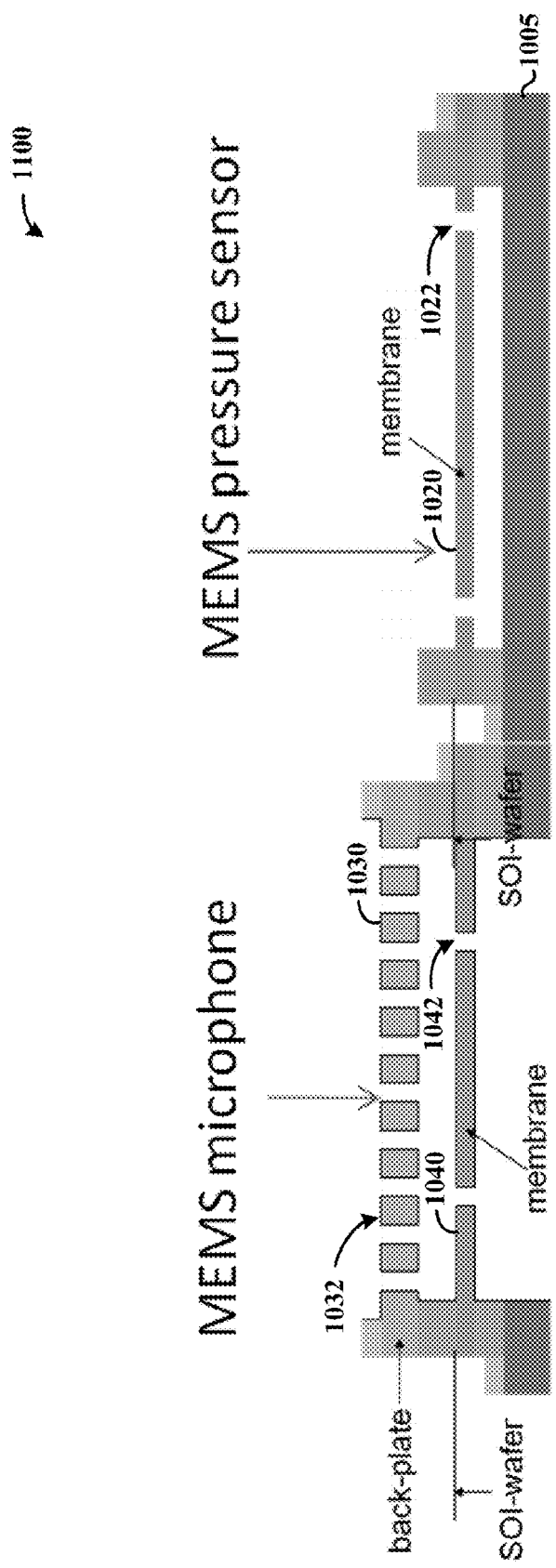
FIG. 11 shows another apparatus that combines a pressure sensor with a MEMS microphone, in accordance with another example embodiment.

FIG. 11 shows another apparatus 1100 that also combines a pressure sensor with a MEMS microphone. The apparatus 1100 is similar to that shown in FIG. 10 and is labeled with similar reference numerals, with the back-plate region 1010 over the membrane 1020 as shown in FIG. 10 not being present on the pressure sensing device. In this embodiment, actuation is carried out between the underlying substrate 1005 and the membrane 1020. The substrate 1005 includes a conducting material, such as highly doped Silicon, and is used to measure the impedance between resonant membrane and substrate.

Figure 12:
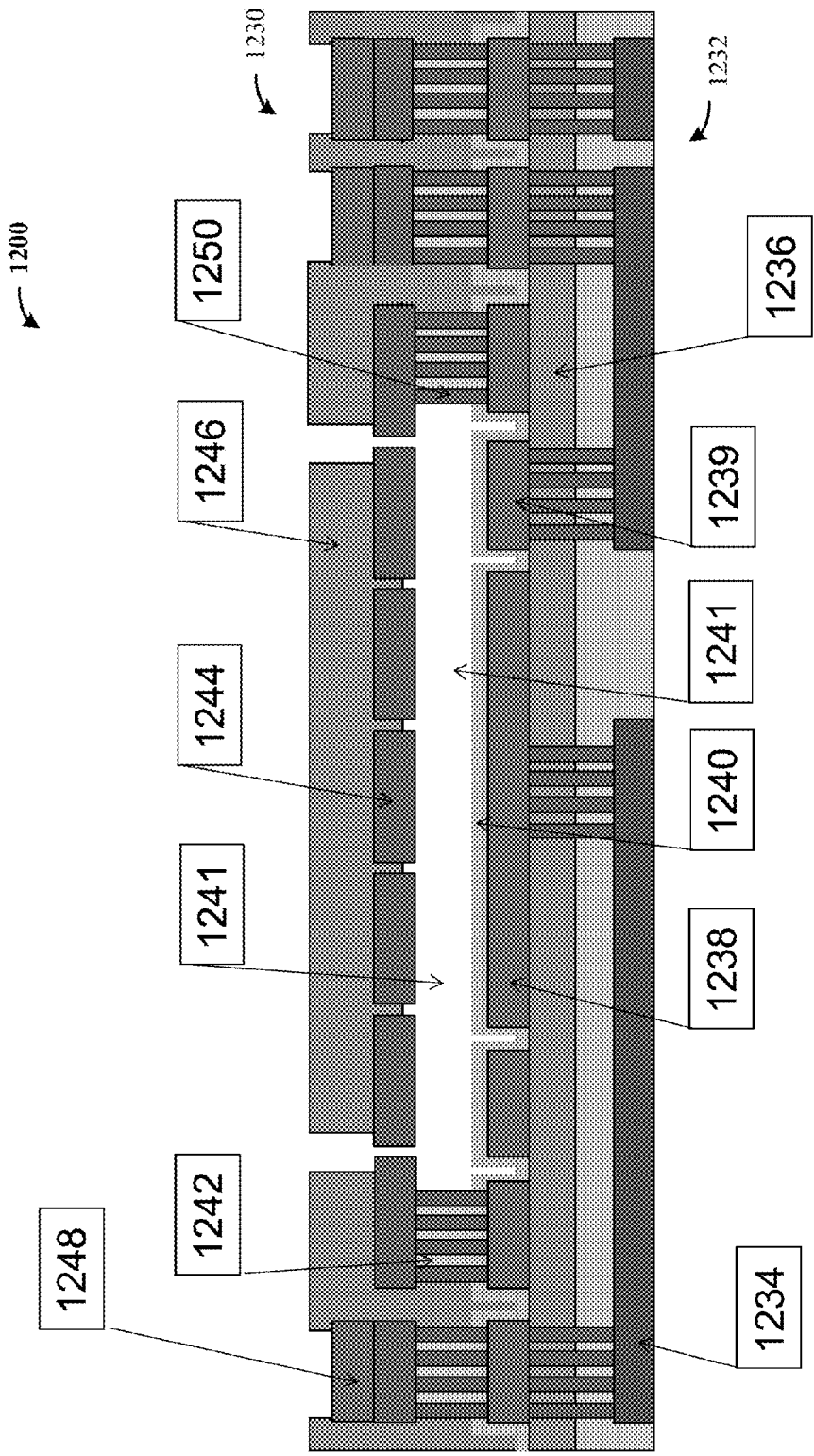
FIG. 12 shows a pressure sensor apparatus at a related process stage, in accordance with another example embodiment.

FIG. 12 shows an apparatus 1200 with a processed wafer (e.g., via CMOS) 1230, as may be implemented in connection with one or more example embodiments. A CMOS back end 1232 includes a top metal layer 1234, with a sensor over the CMOS back end with a passivation layer 1236 between. The pressure sensor includes a planar lower electrode which in this example includes an Al layer 1238 with a Si-rich SiN or a silicon carbide capping layer 1240. In some implementations, a Ti/TiN or tungsten bottom electrode is used. The lower electrode connects to the CMOS top metal layer by means of interconnect vias. The top and bottom electrodes are spaced by a sacrificial oxide 1241, which is removed later on in the processing in the regions between the capacitor electrodes. By forming the pressure sensor on top of an integrated circuit, such as a CMOS circuit, a fully integrated solution is achieved. The top metal layer 1234 of the CMOS circuit can be used to as a shielding plate for the overlying bottom electrode and also to enable the formation of interconnects.

The integration on CMOS facilitates the elimination of bond wires, which reduces parasitic capacitances. Electrical connection to the pressure sensor bottom electrode is also accomplished via the metal interconnect 1234 that lies below the bottom electrode, using vias extending through the passivation layer 1236 below the bottom electrode as shown, which also extend up through the passivation layer 1236 and the oxide 1242 to connect to contact pads 1248.

Top contact pads can be used for the inputs and outputs of the circuit. FIG. 12 shows a contact pad in contact with the bottom capacitor electrode (through a lateral connection in the top metal layer). In some implementations, such direct contact is omitted and capacitor electrodes make contact to the underlying IC for signal processing. The contact pads are then used for the IC inputs and outputs.

The apparatus 1200 includes a tungsten top electrode 1244 and a dielectric sealing layer 1246. The top electrode may include, for example, titanium-tungsten, titanium, titanium nitride, aluminum, SiGe and/or a combination of these materials. A variety of deposition methods for the electrodes 1234, 1238, and 1244 are used to suit various embodiments, and may include Physical Vapor Deposition, High density plasma Sputtering, Plasma Enhanced Chemical Vapor Deposition (PECVD), Chemical Vapor Deposition (CVD), and Atomic Layer Deposition (ALD).

Sealing layer 1246 is deposited after the sacrificial oxide removal, and it is used to fill partially or completely the sacrificial etch openings which are formed over the cavity area of the pressure sensor, which can be used to reduce the diameter and or the number of venting holes in the membrane. In some implementations, the membrane is sealed and then opened again at selected spots to create the venting holes. In other implementations, holes of different sizes are formed, with smaller holes being filled and large holes being made smaller in a common sealing process, resulting in a desired number of holes with a desired hole size. In certain embodiments, the sealing layer includes one or more of silicon dioxide, silicon nitride, or a stacked combination of these materials. Deposition methods for silicon oxide include high density plasma oxide (HDP oxide), Plasma Enhanced Chemical Vapor Deposition (PECVD), Chemical Vapor Deposition (CVD), and Atomic Layer Deposition (ALD).

Aluminum contact pads 1248 provide connections to the device, and W-filled vias extend down from the top aluminum contact pads to the bottom electrode layer and also from the bottom electrode layer to the CMOS top metal layer, as outlined above. If a different material as top electrode such as SiGe is chosen, the vias and anchor points are consequently filled with the different material (SiGe).

SiC layer 1240 mitigates/prevents shorts between the top and bottom electrodes and avoids etching of the underlying passivation layer 1236 by the sacrificial HF vapor etch. In some implementations, Si-rich SiN is used as etch stop/passivation layer. Vias are implemented as electrical connection paths to make contact with the top electrode and of the underlying electronics. In some implementations, anchors 1250 are used as etch stop guard ring around the cavity, and act as a mechanical anchor to fix the membrane deflection at the perimeter of the membrane.

Various approaches are used in process flows as discussed herein and/or for the various apparatuses shown and described. For example, a Si-rich SiN layer can be provided over the bottom electrode instead of SiC, to prevent shorts between the top and bottom electrode. This anti-shorting layer can be provided on top of the sacrificial oxide layer, or a Si-rich SiN layer can be used both beneath and above sacrificial etch oxide. One of these layers can be patterned to device anti-stiction bumps. When a Si-rich SiN layer is provided on top of the sacrificial oxide layer, it can be used as a support layer for the top metal electrode to avoid buckling.

In some implementations, 1238 is used as a bottom electrode for actuation, with electrode 1239 used as a sensing electrode. Other dual-electrode arrangements are used to suit certain embodiments.

Based upon the above discussion and illustrations, those skilled in the art will readily recognize that various modifications and changes may be made to the embodiments herein without strictly following the exemplary embodiments and applications illustrated and described herein. For example, different shapes, thicknesses and types of membrane materials may be used, and different hole sizes, locations and quantities may be used with the membrane to suit different applications. Such modifications do not depart from the true spirit and scope of the present invention, including that set forth in the following claims.

What is claimed is:

1. An integrated circuit apparatus comprising:
   an integrated circuit substrate having a cavity;
   a suspended membrane forming a wall of a chamber that is at least partially in the cavity and that has a variable volume for containing gas, the membrane having a plurality of openings therein configured and arranged to pass gas into and out of the chamber, the membrane being configured and arranged to move and thereby change the volume of the chamber in response to an actuation force applied to the membrane;
   an actuator configured and arranged to cause movement of the membrane relative to the cavity, in response to an electrical control signal carried in the integrated circuit, and thereby change the volume of the chamber and generate a gas pressure inside the chamber that is different than a gas pressure outside the chamber; and
   a sensor configured and arranged to detect, in response to the change in volume, a frequency-based characteristic of the membrane and therein provide an indication of the gas pressure in the chamber.

2. The apparatus of claim 1, wherein the sensor is configured and arranged to
   detect a frequency-based characteristic of the membrane by detecting the frequency above which at least one of the membrane amplitude and membrane phase starts to decrease, and
   provide the indication of the pressure in the chamber based upon the detected frequency.

3. The apparatus of claim 1, wherein the sensor is configured and arranged to
   detect a frequency-based characteristic of the membrane by detecting at least one of an amplitude and phase of the membrane while the membrane is actuated at a particular frequency, and
   provide the indication of the pressure in the chamber based upon the detected at least one of an amplitude and phase at the particular frequency.

4. The apparatus of claim 1, wherein the sensor is configured and arranged to
detect a frequency-based characteristic of the membrane by detecting a shift of a resonance frequency of the membrane with respect to the resonance frequency at a reference pressure, and
provide the indication of the pressure in the chamber based upon the detected shift in resonance frequency.

5. The apparatus of claim 1, wherein the sensor is configured and arranged to provide an indication of the pressure in the chamber based upon viscosity of the gas and flow resistance of the openings, while the membrane is actuated at a frequency below its resonance frequency.

6. The apparatus of claim 1, wherein
the membrane is configured and arranged to flow gas via the openings to equilibrate pressure between gas in the chamber and gas external to the chamber below a threshold frequency, and to mitigate substantially all gas flow via the openings above the threshold frequency,
the actuator is configured and arranged to cyclically actuate the membrane above the threshold frequency, and
the sensor is configured and arranged to detect the frequency-based characteristic of the membrane while the membrane is being cyclically actuated above the threshold frequency, the detected frequency-based characteristic being indicative of pressure outside the chamber.

7. The apparatus of claim 1, wherein the sensor is configured and arranged to
detect the characteristic of the membrane by detecting a deflection of the membrane responsive to the change in volume, and
use the detected deflection to provide an indication of pressure in the chamber.

8. The apparatus of claim 1, wherein
the actuator is configured and arranged to cause movement of the membrane by applying a time-varying actuation bias to the membrane to actuate the membrane, and
the sensor is configured and arranged to detect deflection of the membrane based on the actuation bias.

9. The apparatus of claim 1, wherein
the actuator is configured and arranged to cause movement of the membrane by causing cyclic movement of the membrane at a resonant frequency of the membrane, and
the sensor is configured and arranged to
detect the characteristic of the membrane by, when the membrane is cyclically moved, detecting an increase in resonance frequency of the membrane that is responsive to the change in volume, and
use the detected resonance frequency to provide an indication of pressure in the chamber.

10. The apparatus of claim 9, wherein the actuator is configured and arranged to actuate the membrane with a single pulse, and the sensor is configured and arranged to detect the resonance frequency of the membrane responsive to the single pulse.

11. The apparatus of claim 1, wherein the sensor is configured and arranged to
detect the characteristic of the membrane by detecting damping of the membrane that is responsive to the movement of the membrane, and
use the detected damping to provide an indication of pressure in the chamber.

12. The apparatus of claim 11, wherein the actuator is configured and arranged to actuate the membrane with a single pulse, and the sensor is configured and arranged to detect the damping of the membrane responsive to the single pulse.

13. The apparatus of claim 1, wherein the sensor is configured and arranged to detect the characteristic of the membrane by detecting a response of the membrane to the change in volume to provide an indication of a pressure difference between a pressure in the chamber and a pressure in the chamber.

14. The apparatus of claim 1, wherein the sensor is configured and arranged to detect the frequency-based characteristic by detecting an equalization speed of gas in the chamber, and using the detected speed to determine an indication of a number of gas molecules in the chamber.

15. The apparatus of claim 1, wherein the sensor is configured and arranged to detect the frequency-based characteristic based upon the number and size of the plurality of openings.

16. The apparatus of claim 1, wherein
the actuator is configured and arranged to cause movement of the membrane relative to the cavity by actuating the membrane to cyclically compress and expand gas in the chamber over a plurality of cycles, and
the sensor is configured and arranged to detect the frequency-based characteristic by computing a time averaged ambient pressure in the chamber over a plurality of the cycles.

17. The apparatus of claim 1, wherein the sensor is configured and arranged to detect the frequency-based characteristic by detecting a spring constant of the membrane and using the detected spring constant to provide the indication of gas pressure in the chamber.

18. The apparatus of claim 1, wherein the plurality of openings includes at least one of venting holes between about 100 nm and 2000 nm in diameter, and venting holes having a diameter of less than 2 nm.

19. The apparatus of claim 1, wherein the sensor is configured and arranged to determine the gas pressure inside the chamber based on the indication of the gas pressure and upon an actuation input provided via the actuator to cause the movement of the membrane.

20. An integrated circuit pressure sensor comprising:
a gas chamber having walls configured and arranged to contain a gas, the walls including a membrane having an electrode and configured and arranged to move and thereby change the volume of the chamber in response to a bias applied to the electrode, the membrane having a plurality of openings configured and arranged to
flow gas via the openings to equilibrate pressure between gas in the chamber and gas outside of the chamber,
flow gas into and out of the chamber when the membrane is actuated below a threshold frequency, and
in response to the membrane being actuated above the threshold frequency, mitigate substantially all gas flow via the openings;
an actuator circuit having an electrode and configured and arranged to apply a time-varying actuation bias to the membrane via the electrodes, to cyclically actuate the membrane and therein compress and expand the volume of the chamber; and
a sensor configured and arranged to
in response to the actuator circuit actuating the membrane at a resonant frequency of the membrane, detect a shift of the resonance frequency of the membrane based on an impedance between the electrodes, and provide an indication of the pressure in the chamber based upon the detected shift in resonance frequency, and in response to the actuator circuit actuating the membrane and pumping air through the openings, provide an indication of the pressure in the chamber based upon viscous flow of the gas through the openings.

21. The apparatus of claim 20, wherein the sensor is configured and arranged to provide an indication of the pressure in the chamber based upon at least one of: a frequency at which membrane amplitude starts to decrease and the membrane amplitude or phase at a particular frequency, as indicated via an impedance between the electrodes.

22. A pressure sensor apparatus comprising:
a chamber having sidewalls;
a membrane that forms one of the sidewalls and having a plurality of openings therein configured and arranged with an opening size that prevents substantially all gas flow through the opening when the membrane is actuated above a resonant frequency, and that facilitates gas flow through the opening when the membrane is actuated below the resonant frequency;
an actuator configured and arranged to cyclically actuate the membrane to rapidly compress and expand gas in the chamber; and
a sensor configured and arranged to detect a frequency-based characteristic of the membrane responsive to the cyclic actuation, and to provide an output indicative of the pressure at the membrane based on the detected frequency-based characteristic.

23. A method of manufacturing an integrated circuit apparatus, the method comprising:
forming an integrated circuit substrate having a cavity;
forming a suspended membrane forming a wall of a chamber that is at least partially in the cavity and that has a variable volume for containing gas, and forming a plurality of openings in the membrane to pass gas into and out of the chamber, the membrane being configured and arranged to move and thereby change the volume of the chamber in response to an actuation force applied to the membrane;
forming an actuator that causes movement of the membrane relative to the cavity, in response to an electrical control signal carried in the integrated circuit, and thereby changes the volume of the chamber and generate a gas pressure inside the chamber that is different than a gas pressure outside the chamber; and
forming a sensor that detects a frequency-based characteristic of the membrane responsive to the change in volume, and therein provide an indication of the gas pressure in the chamber.

24. The method of claim 23,
wherein forming a suspended membrane includes forming a membrane having a plurality of openings of differing sizes,
further including performing a sacrificial etch of a material below the membrane, via the plurality of openings, and
after performing the sacrificial etch, applying a sealing layer to seal at least some of the openings.

25. The method of claim 24, wherein applying a sealing layer to seal at least some of the openings includes applying a sealing layer to seal ones of the openings having a size below a threshold size and to reduce the size of the openings above the threshold size.

* * * * *